UNITED STATES PATENT OFFICE.

HANS WOLFF, OF BERLIN, GERMANY, ASSIGNOR TO GEBRÜDER SCHUBERT, OF BERLIN, GERMANY.

ADHESIVE ROSINOUS PREPARATIONS AND PROCESS OF PRODUCING THE SAME.

1,095,058.   Specification of Letters Patent.   Patented Apr. 28, 1914.

No Drawing.   Application filed November 29, 1912.   Serial No. 734,213.

*To all whom it may concern:*

Be it known that I, HANS WOLFF, a citizen of the German Empire, and residing at Berlin, Germany, have invented certain new and useful Improved Adhesive Rosinous Preparations and Process of Producing the Same, of which the following is a specification.

My invention relates to processes for increasing the adhesiveness of mixtures of rosins.

In the painting and varnishing trades it is well-known to employ adhesive rosin masses for certain purposes, and also in the gilding trade. Likewise, adhesive mixtures of rosins, such as gum mastic solutions for example, are used for attaching beards and wigs. Recently, such adhesive rosin solutions have also been employed in medicine for fixing bandages. Now it has been found that the adhesiveness of all these rosin solutions is only small and very uncertain, which is a very great defect particularly when attaching beards and wigs with such adhesive rosin solutions.

A primary object of my invention is to provide rosinous mixtures which are distinguished by specially great adhesiveness. I have found that when the solvent of rosin solutions has been evaporated a strong and very adhesive residue is obtained when an admixture of small quantities of liquid esters of the aromatic acids have been added to the solutions. It is then not necessary to use such relatively expensive rosins as mastic, but cheaper rosins, such as colophonium and the like can be employed. Also, gum rosins and balsams can then be employed for the present purpose.

As solvent, benzol has been found to be specially advantageous; other relatively readily volatile solvents may however be employed, such as benzin, chloroform, alcohol, ether and the like, as well as mixtures of these solvents. In the case of adhesive substances such as glue for beards, which are applied directly on the skin, it is preferable, however, not to employ such a solvent as chloroform which is adapted to irritate the skin.

The following example will serve for explaining my invention:—15 parts colophonium and 15 parts sandarac are dissolved in 70 parts benzol, and 5 parts benzoic ethylic ether are added thereto.

The present invention can be very advantageously employed in connection with the mastic bandages which have recently been proposed by Dr. von Oettingen and are made with mastic. Chloroform was generally used for these as the solvent, but its use had the defect that small quantities of it were retained by the mastic; the adhesive action of the mastic bandages made with such chloroform solutions is perhaps restricted and, on the other hand, irritation of the skin is caused which may lead to very undesirable secondary effects. It has already been proposed to substitute the chloroform by benzol and the like, but the solutions made with it were considerably inferior in adhesiveness and also in the duration of the adhesiveness to the chloroform mastic solutions. When employing the above-described new process for the manufacture of such mastic solutions used for mastic bandages it has been found that the adhesiveness can be very considerably increased in this case also by adding small quantities of the liquid esters of the aromatic acids. By employing the mentioned admixtures it is also possible to add to the mastic other rosins, gum-rosins or balsams, and thus to replace a part of the mastic by cheaper rosins, without materially diminishing the adhesiveness of such rosin plasters.

The following are examples of esters which may be used:—

Benzoic ethylic ether $C_6H_5$—$COOC_2H_5$,
Benzoic benzylic ether $C_6H_5$—$COOC_6H_5$,
Benzoic methylic ether $C_6H_5$—$COOCH_3$,
Salicylo ethylic ether $C_6H_4OHCOOC_2H_5$,
Salicylo methylic ether $C_6H_4OHCOOCH_3$.

It is thus possible not only to cheapen the solutions used in making mastic plaster, but also to avoid using in their preparation the expensive and dangerous chloroform which, as stated above, has various disadvantages attached to it in medicinal practice.

The following will serve for explaining more clearly this mode of carrying my invention into practice:—If a solution of equal parts of mastic and colophonium in benzol is made, it is found that the residue remaining after the evaporation of the excess of benzol has an adhesiveness which is neither sufficient in practice nor of long duration. If a small quantity, say 5%, of a liquid ester of an aromatic acid be added, however, the adhesiveness is materially increased, so that it suffices for the most severely strained bandages and the like and is of almost unlimited duration.

Example 1: 15 parts mastic and 15 parts colophonium are dissolved in 70 parts benzol and 5 parts salicylo methylic ether are added.

Instead of benzol, a more volatile solvent of rosin may be used, e. g., benzol, petrolether and the like, which are not capable of causing irritation of the skin.

Example 2: 15 parts mastic and 15 parts colophonium are dissolved in 70 parts benzol and 2 parts salicylo methylic ether and 1 part benzoic methylic ether are added.

Example 3: 15 parts mastic and 15 parts colophonium are dissolved in 70 parts benzol and 2.5 benzoic benzylic ether and 2.5 benzoic ethylic ether are added.

Example 4: 10 parts mastic are dissolved in 15 parts benzol and 1.5 parts benzoic ethylic ether are added.

To heat rosins with phtalic acid ethers in order to dissolve them in the phtalic acid esters is already known. The present invention, however, distinguishes from such a process in that the esters are not used as means to effect the solution but the ordinary solvents, as benzol, chloroform, etc., are employed, and to this solution when cold is added a small quantity of a liquid ester of an aromatic acid in order to increase the adhesive power.

I claim:—

1. A process for increasing the adhesiveness of rosin mixtures, consisting in dissolving a rosin mixture in a common solvent of rosin and adding a small quantity of a liquid ester of an aromatic acid.

2. A process for increasing the adhesiveness of rosin mixtures, consisting in dissolving a rosin mixture in a common solvent of rosin and adding a small quantity of a mixture of liquid esters of aromatic acids.

3. A process for increasing the adhesiveness of rosin mixtures, consisting in dissolving a rosin mixture containing mastic rosin in a common solvent of rosin, and in mixing the solution thus obtained with a small quantity of a liquid ester of an aromatic acid.

4. A process for increasing the adhesiveness of rosin mixtures, consisting in dissolving a rosin mixture containing mastic rosin in benzol, and in mixing the solution thus obtained with a small quantity of a liquid ester of an aromatic acid.

5. A plaster consisting of a rosin mixture containing mastic and a small percentage of a liquid ester of an aromatic acid.

In testimony whereof, I affix my signature in the presence of two witnesses.

Dr. HANS WOLFF.

Witnesses:
  HENRY HASPER,
  WOLDEMAR HAUPT.